(12) United States Patent
Müller et al.

(10) Patent No.: US 12,139,354 B2
(45) Date of Patent: Nov. 12, 2024

(54) DE-STACKING DEVICE FOR SEPARATING LIDS

(71) Applicant: FERRUM PACKAGING AG, Schafisheim (CH)

(72) Inventors: Thomas Müller, Safenwil (CH); Roger Gisler, Aarau (CH)

(73) Assignee: FERRUM PACKAGING AG, Schafisheim (CH)

( * ) Notice: Subject to any disclaimer, the term of this patent is extended or adjusted under 35 U.S.C. 154(b) by 0 days.

(21) Appl. No.: 18/219,064

(22) Filed: Jul. 6, 2023

(65) Prior Publication Data

US 2024/0025674 A1    Jan. 25, 2024

(30) Foreign Application Priority Data

Jul. 19, 2022   (EP) .................................... 22185610
Aug. 17, 2022  (EP) .................................... 22190807

(51) Int. Cl.
*B65G 59/06* (2006.01)
*B65B 7/28* (2006.01)

(52) U.S. Cl.
CPC .......... *B65G 59/066* (2013.01); *B65B 7/2807* (2013.01)

(58) Field of Classification Search
CPC ... B65B 7/2807; B65B 7/2842; B65B 7/2857; B65B 31/02; B21D 51/2692; B21D 51/32; B65G 59/066; B65G 33/06; B65G 33/04; B65G 57/307; B65G 59/10; B65G 59/108; B65G 59/105; B65G 2207/30; B65G 59/06; B65G 59/102
See application file for complete search history.

(56) References Cited

U.S. PATENT DOCUMENTS

| 1,967,254 | A |   | 7/1934 | Murch |         |
|-----------|---|---|--------|-------|---------|
| 2,840,963 | A | * | 7/1958 | Osmond ............... | B65B 7/2807 53/73 |
| 3,198,382 | A | * | 8/1965 | Cleary ................. | B65G 59/108 221/222 |
| 3,741,410 | A | * | 6/1973 | Henschke ............ | B65G 59/108 221/222 |
| 3,862,702 | A | * | 1/1975 | Johnson ............... | B65G 59/108 221/222 |
| 4,044,896 | A | * | 8/1977 | Reinecke ............. | B65G 59/108 221/297 |

(Continued)

FOREIGN PATENT DOCUMENTS

| EP | 2186760 A1 |   | 5/2010 |            |
|----|------------|---|--------|------------|
| EP | 3838817 A1 | * | 6/2021 | ........... B65G 59/102 |
| GB | 1393810 A  | * | 5/1975 | ........... B65G 59/108 |

OTHER PUBLICATIONS

European Search Report issued May 25, 2023 in corresponding European Application No. 22190807.2.

*Primary Examiner* — Gregory W Adams
(74) *Attorney, Agent, or Firm* — Global IP Counselors, LLP

(57) ABSTRACT

A de-stacking device includes a de-stacking element, a supporting element for supporting a lid stack, and a groove for receiving and discharging a separated lid. The groove is arranged on the de-stacking element and the supporting element. The de-stacking device further includes a separating element, which is arranged on a first end of the groove such that the lid can be separated from the lid stack and can be received by the groove.

18 Claims, 8 Drawing Sheets

(56) References Cited

U.S. PATENT DOCUMENTS

| | | | | |
|---|---|---|---|---|
| 4,152,997 A | * | 5/1979 | Webster | B21D 51/2653 |
| | | | | 413/52 |
| 4,244,671 A | * | 1/1981 | Sera | B65G 59/105 |
| | | | | 414/797.9 |
| 4,288,003 A | * | 9/1981 | Fries, Jr. | B65G 59/108 |
| | | | | 221/222 |
| 4,441,630 A | * | 4/1984 | Sauer | B65G 59/108 |
| | | | | 221/241 |
| 5,151,001 A | * | 9/1992 | Kawaguchi | B23Q 1/5468 |
| | | | | 414/223.01 |
| 5,240,364 A | * | 8/1993 | Pazzaglia | B21D 51/2692 |
| | | | | 413/48 |
| 5,788,116 A | * | 8/1998 | Bednar | B65G 59/108 |
| | | | | 221/241 |
| 11,370,623 B2 | * | 6/2022 | Langwieser | B65G 59/066 |

* cited by examiner

DE-STACKING DEVICE FOR SEPARATING LIDS

CROSS-REFERENCE TO RELATED APPLICATION

This application claims priority to European Patent Application No. 22185610.7, filed Jul. 19, 2022 and European Patent Application No. 221908072, filed Aug. 17, 2022, the contents of each of which are hereby incorporated by reference in their entirety.

BACKGROUND

Technical Field

The disclosure relates to a de-stacking device for separating lids, a feeding device for feeding lids and a sealer. The disclosure further relates to a method for separating lids.

Background Information

During the filling of beverage cans or food cans, the cans pass through a can sealer after being filled with the beverage or foodstuff, whereby the filled can bodies enter via a feed path and can lids enter via a further feed path. The can sealer usually has several similar stations arranged in a carousel shape, in each of which a can is sealed with a can lid. The can lids are guided onto the can bodies and held on the can body by a holding plate of a seaming head. This holding also serves to fix the cans against breaking out of the circular path passed by the cans in the can sealer due to the centrifugal force. In the can sealer, the can bodies with the can lid are seamed over a seaming roll at the edges and thus sealed. Normally, the can with the can lid is additionally rotated around its own axis of symmetry by the seaming head. For rotation, the seaming rolls and seaming heads are arranged on a seaming shaft pin or a seaming shaft.

A generic can sealer is described in DE749636 and DE423411.5 A1. The can sealer comprises a clamping device for receiving a can to be sealed. In the operating state, the can to be sealed is introduced into the clamping device and secured by the clamping device in the axial and radial directions. A can lid is also introduced centered over the can opening of the can to be sealed. The can has a circumferential can flange in the area of the can opening and the can lid has a circumferential can lid flange. For sealing the can opening with the can lid, the can sealer additionally comprises two seaming rolls, mounted rotatably about an axis in each case, which seaming rolls press the can flange and the can lid flange together by a force acting substantially radially, the pressing being effected by a continuous rolling in the circumferential direction along the circumference of the can opening.

For providing the can lids, feeding devices are used in which the can lids are fed in a lid stack and are separated for placing on the cans by a de-stacking device. Such a feeding device is disclosed in EP 3 453 625 A1.

For a better understanding of the subject matter of the present disclosure, a conventional feeding device for a can sealer known from the state of the art is described in the following on the basis of FIG. 1.

For a better distinction of the known state of the art from the present disclosure, reference signs to features of known devices are provided with an inverted comma (in FIGS. 1, 2A, 2B and 8A) in the context of this application, whereas features to devices according to the disclosure or their components do not carry an inverted comma.

The feeding device 1001' according to FIG. 1 comprises a de-stacking device 1' with a de-stacking screw 10' and a subsequent transport device and/or treatment device 16', which has a separate drive 31'.

The de-stacking screw 10' segregates and separates the lids 101' from the stack 111' with the aid of a spiral-shaped groove 11'. For this purpose, the de-stacking screw 10' is driven by its own drive 40', which is designed as a servo drive.

The lids 101' to be conveyed are fed in the lid feeder 41', which is arranged immediately above the de-stacking screw 10'. The lids 101' are conveyed downwards by gravity in the direction of the de-stacking screw 10'. The de-stacking screw 10' is driven by the drive 40', whereby it performs a rotational movement about the axis Y', which is indicated by an arrow 13'. The spiral-shaped groove 11' engages in each case an edge portion of a single lid 101' and is shaped in such a way that it can move a single lid 101' out of the feeder 41' and can convey and deliver it downwardly in the direction of the subsequent transport device and/or treatment device 16' by the rotational movement 13' of the de-stacking screw After delivering a single lid 101' to the subsequent transport device and/or treatment device 16', the de-stacking screw 10' continues to rotate and can again receive a single lid 101' from the feeder 41' and convey it to the subsequent transport device and/or treatment device 16'.

The transport device and/or treatment device 16' rotates in the direction indicated by an arrow 32'. The drive 31' of the subsequent transport device and/or treatment device 16' and the drive 40' of the de-stacking screw 10' are coordinated with each other in such a way that the delivery speed of the de-stacking screw 10' of lids 101' from the feeder 41' corresponds to the receiving speed of the subsequent transport device and/or treatment device 16'. In this way, it is ensured that a lid 101' is provided in a timely manner for each can to be filled and sealed (not shown in FIG. 1) and that there are no delays or malfunctions.

However, to enable a correct separation of the lids 101' from the stack 111', the de-stacking screw 10' must be replaced in the event of a format change (i.e., a changeover to a different, in particular also larger lid size/container size). For this purpose, for example, the de-stacking screw 10' can be removed from the shaft 42' and a de-stacking screw adapted to the new format can be installed.

This is explained in more detail with respect to FIGS. 2A and 2B.

By some sealers, different lid sizes available on the market can be de-stacked and processed. The central component of the de-stacking system is the de-stacking screw 10'. This separates the lids 101' from the stack and deposits them on an inner lid guide 15B'. The separation process is carried out by a knife 51', which is attached to the de-stacking screw 10'. Due to the clockwise rotational movement in the direction of the arrow 13', the knife 51' pierces the stack. Then, the lid 101' is guided downward into the inner lid guide 15B' via a spiral/the spiral-shaped groove 11'.

The lid 101' rests on the other side on a replaceable support 151A', which is attached to an outer lid guide 15A'. By the rotation of the transport device and/or treatment device 16', the lid 101' is introduced into the outer lid guide 15A'.

Depending on the design, the de-stacking screw 10' is format-dependent and must be changed when changing to a different lid size.

Consequently, tool changes to adapt to other formats cannot be avoided. In this case, the tool change times for the de-stacking screw are very high and usually require a specialist to make the exchange possible at all.

It is therefore an object of the disclosure to provide a de-stacking device, a feeding device and a sealer which avoid the adverse effects known from the state of the art. In particular, a de-stacking device, a feeding device and a sealer are to be provided, which are simply designed, versatile, quickly adaptable and/or easy to clean.

The object is met by a de-stacking device according to the disclosure, a feeding device according to the disclosure, a sealer according to the disclosure and by the method according to the disclosure.

According to the disclosure, a de-stacking device for separating lids from a lid stack is proposed. The de-stacking device comprises a de-stacking element, a supporting element for supporting the lid stack and a groove for receiving and discharging a separated lid (from the lid stack). The groove is arranged on the de-stacking element and the supporting element, in particular inserted in the de-stacking element and the supporting element, i.e., in particular the de-stacking element and the supporting element comprise the groove.

In addition, the de-stacking device comprises a separating element which is arranged on (a first end of) the groove in such a way—that the lid can be separated from the lid stack by the separating element and can be received by the groove (i.e., can be inserted in the groove).

The supporting element is a separate element from the de-stacking element and is arranged on the de-stacking element such that a supporting surface of the supporting element is arranged relative to the separating element in such a way that the lid stack can be supported on the supporting surface and the lid can be separated from the lid stack. The supporting element is thus in particular an autonomous element separate from and/or independent of the stacking element.

Thus, the lid stack can be supported on the supporting surface and, by a movement such as a rotation of the de-stacking device, the separating element can be inserted between the lid stack and the lid to be separated, whereby the lid is then guided via the groove to a subsequent device such as a lid guide. Of course, the lid stack can also be partially supported on the de-stacking, element during the movement of the de-stacking device. However, the lid stack is supported on the supporting surface in particular immediately before the lid is separated by the separating element.

Since the supporting element is a separate element from the de-stacking element, tool change times can be massively reduced, since only the supporting element (or alternatively the de-stacking element) must be adjusted in the case of a format change and the entire de-stacking device does not have to be replaced.

In the case of a format change, the thickness and/or the radius of the lid change inter alia. As a consequence, a distance between the supporting surface and the separating element must be adjusted, as this ensures that the separating element pierces the lid stack at the correct point to separate a single lid.

In practice, the separating element can be designed as a knife known in the state of the art. In addition, the separating element can be comprised by the de-stacking element, i.e., in particular be an integral part of the de-stacking element. As an alternative, the separating element can be a separate element from the de-stacking element and supporting element, which is arranged or attached (in particular replaceable) to the de-stacking element and/or supporting element.

The first end of the groove can in particular be understood as an entry area for the lid into the groove. The supporting element can be arranged directly on or attached to the de-stacking element. The groove can in particular be understood as an elongated indentation in the de-stacking element and the supporting element for guiding the lid. Especially, the groove can also be designated as a joint or notch.

In an embodiment of the disclosure, a position of the supporting surface relative to the separating element can be variable or adjustable to adjust the distance between the supporting surface and the separating element. For this purpose, the supporting element can be arranged (or attached to) in a replaceable manner on the de-stacking element in such a way that the position of the supporting surface relative to the separating element can be changed. This means that the supporting element can be replaced by another supporting element in which the supporting surface is shaped and/or positioned differently. For this purpose, the supporting element can be attached to the de-stacking element by a detachable screw connection, for example. In addition, the supporting element can be arranged in a displaceable manner on the de-stacking element in such a way that the position of the supporting surface relative to the separating element can be changed. For example, by adjusting the height of the supporting element, the position relative to the separating element can be adjusted. As an alternative, the de-stacking element or the separating element can also be replaceable or movable.

In an embodiment of the disclosure, the de-stacking device can be designed as a de-stacking screw and the groove can extend in a spiral shape along the de-stacking screw. In this way, the lid can be guided downwards in particular from above in a spiral-shaped movement to a lid guide (as part of a subsequent device).

In a particularly preferred embodiment, the supporting surface is a chamfer (i.e., a beveled supporting surface), in particular a sickle-shaped chamfer.

According to the disclosure, a feeding device for feeding a lid to a sealer is further proposed, which feeding device comprises a de-stacking device according to the disclosure. Furthermore, the feeding device comprises a lid feeder for feeding the lids in the lid stack, wherein the lid feeder is arranged on the de-stacking device in such a way that the lids which can be fed in the lid stack can be separated by the de-stacking device.

The de-stacking device can be arranged in a rotatable manner in such a way that the lids can be separated by the rotation of the de-stacking device. For this purpose, the de-stacking device can be connected to a drive such as a servo drive via a shaft. For this purpose, the de-stacking element can comprise a receiving—area, in particular a receiving opening for the shaft. Consequently, the supporting element is connected to the shaft via the de-stacking element and the de-stacking element can be understood as a basic element via which the other components are attached to the shaft and consequently connected to the drive.

In a particularly preferred embodiment, the de-stacking element comprises the receiving opening, the supporting element is attached to the stacking element in a removable manner, and the separating element is a separate element from the de-stacking, element and supporting element that is attached to the support element in a removable manner.

In addition, the feeding device can comprise the lid guide for guiding the lid to the sealer (or to a container in the sealer) and a movement device arranged on the lid guide.

The movement device is arranged in a moveable manner in such a way that the lid can be moved along the lid guide, wherein the lid guide is arranged on the de-stacking device in such a way that a lid separated from the lid stack can be inserted into the lid guide, i.e., in particular can be deposited therein.

The lid guide can be designed for guiding the lid along a guide plane, wherein the lid can be moved along the guide plane by the movement device. The lid guide can be formed in such a way that the lid can be moved in the lid guide exclusively parallel to the guide plane. In particular, exclusively parallel means here that the lid (in particular with its surface or depositing surface) can only be moved in the lid guide parallel to the guide plane. The surface of the lid or depositing surface (with which the lid rests on the lid guide) can be moved completely parallel to the guide plane. Especially, in contrast to the state of the art, the lid guide does not comprise a ramp which first guides the lid to a ramp level different from the guide plane and aligned differently, and then aligns it parallel to the guide plane. In doing so, a jumping, of the lid in the lid guide can be prevented. In the context of the disclosure, parallel is to be understood as genuinely parallel or identical.

In addition, the lid guide can be arranged on the de-stacking device in such a way that the lid can be introduced into the lid guide from the de-stacking device directly parallel to the guide plane.

In particularly preferred embodiments of the disclosure, the feeding device further comprises a hold-down device, which is arranged on (in particular above) the lid guide in such a way that a movability of the lid in a spatial direction (in particular upwards) can be restricted.

The hold-down device can comprise a hold-down surface for restricting the movability of the lid, and the hold-down surface can be arranged parallel to the guide plane, in particular completely parallel to the guide plane.

The lid guide can comprise a depositing surface, in particular a first and second depositing surface, on which the lid can be deposited and/or comprise a first guide surface and a second guide surface, wherein the lid can be arranged between the first guide surface and the second guide surface in such a way that the lid can be guided to the sealer by the relative movement of the movement device to the first guide surface and the second guide surface.

Here, the hold-down surface can be arranged parallel, in particular completely parallel, to the depositing surface, whereby the depositing surface can also be arranged parallel, in particular completely parallel, to the guide plane.

The lid guide can comprise a first rail and a second rail. The second rail can extend parallel to the first rail. In addition, the first rail can comprise the first guide surface and/or the first depositing surface and the second rail can comprise the second guide surface and/or the second depositing surface so that the lid can be guided to the sealer by the first and second rail. The first and second rail can be designed as outer and inner lid guide. The outer and inner lid guide can each be composed of several segments and can comprise replaceable elements or segments (which can be replaced, for example, during a format change).

According to the disclosure, a sealer is further proposed, comprising a station with a plurality of sealing devices, in particular arranged in a carousel-shape, a container feed for containers, in particular containers filled with a product, to the station, a feeding device according to the disclosure and an outlet for sealed containers from the station.

According to the disclosure, a method for separating lids from the lid stack by the feeding device according to the disclosure is also proposed. In the method according to the disclosure, the lids are fed by the lid feeder in the lid stack and the lids fed in the lid stack are separated by the de-stacking device.

The de-stacking device according to the disclosure is suitable for conveying the lids fed via the lid feeder and for delivering them in the correct spacing to a subsequent transport device and/or treatment device (such as the lid guide and/or the sealing devices).

The groove can engage with an edge portion of the lid and then convey it in the direction of the subsequent lid guide. In other words, the lids are moved out of the lid feeder individually, in particular, a conveying of the lids only takes place when the de-stacking device moves, in particular rotates.

A transfer in the correct spacing can be understood to mean that the de-stacking device is coordinated with the movement device. In particular, the transfer of the lids to the movement device therefore does not take place continuously, but in a timed manner, i.e., when a lid is to be provided for a filled container to be sealed in the sealing device of the sealer. For example, this timing can be realized via the geometry of the groove and/or via the geometry of the de-stacking device itself and/or via the drive of the de-stacking device.

The movement device can be designed in the form of a rotating movement device. Linear movement devices, for example in the form of conveyor belts, are also possible.

Thus, the lid can be set in motion by the movement device, but the direction of the lid movement is predetermined by the lid guide, in particular the first and second guide surface. Thereby, the lid is preferably supported on the lid guide/is carried by the lid guide and is not placed on the movement device as in the state of the art is not carried by the movement device). Thus, the lid can be supported on the lid guide in such a way that the lid is carried by the lid guide.

Thus, the movement device can perform relative movement to the first guide surface and the second guide surface, i.e., in particular, that the first guide surface and the second guide surface (and the rails/lid guide, respectively) are arranged stationary (i.e., immobile), whereby the movement device moves past the first guide surface and the second guide surface and moves the lid between the guide surfaces in this way. Preferably, the movement device can be moved along the first guide surface and the second guide surface, in particular can be moved between the first guide surface and the second guide surface, such that the lid can be moved between the guide surfaces.

For carrying/supporting the lid, the lid guide can comprise the depositing surface, preferably the first and second depositing surface, on which the lid can be arranged and on/via which the lid can be moved by the movement device. Thus, the lid would be movable along the first and second guide surface and on the (first and second) depositing surface. However, oblique guide surfaces (having an angle not equal to 90° compared to a lid surface) can also function as depositing surfaces so that the lid can be arranged on the oblique guide surfaces.

Particularly preferably, the lid is carried exclusively by the depositing surface/depositing surfaces or the oblique guide surfaces and is not deposited on the movement device.

Due to such a lid guide, a simpler and more stable lid guide is in particular provided. In particular, the lid no longer has to be placed on a gassing rotor but can rest on the lid guide until it is brought together with the container. Since the lid no longer rests on the gassing rotor, a greater variety of can shapes can be sealed (in particular with respect to a neck area of the container).

To enable a simple and rapid adaptation to different lid formats and shapes, the first and second guide surface or rail can be arranged displaceably relative to one another in such a way that a distance between the first and second guide surface can be changed. In this way, the changeover time for machine parts in the sealer can be significantly reduced.

In addition, the movement device can comprise a carrier. Preferably, the carrier is attached to the movement device in such a way that the lid can be received by the carrier and can be moved in the lid guide by the carrier. Thus, the carrier is that part of the movement device by which the lid is contacted and moved.

In this context, can be moved in the lid guide means, in particular, that the carrier can move the lid on the guide surfaces along and via the guide surfaces or depositing surfaces. For this purpose, the carrier can be arranged in a moveable manner between the first guide surface and the second guide surface (and possibly also between the first and second depositing surface).

In practice, the movement device can comprise a plurality of carriers so that a plurality of lids can be received by the plurality of carriers and can be moved by the lid guide. Preferably, the plurality of carriers can be distributed along a circumference of the movement device. Here, the plurality of carriers can be arranged circularly along the circumference of the movement device. Particularly preferably the movement device is attached to a shaft and arranged in a rotatable manner about an axis by this shaft, so that the lid can be moved by a rotation of the movement device. The movement device can therefore be a rotatable movement device. For this purpose, the movement device is preferably designed in the shape of a disk, ring, star or circular ring, and the shaft is arranged at a center point of the movement device.

Carriers arranged on the movement device can be arranged on a surface of the movement device (i.e., in particular, the disk/circular ring) in such a way that they extend in the direction of the axis about which the shaft rotates, or can be arranged on a surface of the movement device (i.e., in particular, the disk/circular ring) that extends perpendicular to the axis about which the shaft rotates. As an alternative to the rotatable movement device, a linear movement device can also be used.

The movement device can be arranged with an upwardly-directed carrier below the first and second rail or with a downwardly-directed carrier above the first and second rail. In this case, the carrier can preferably be moved in a recess between the first and second rail. A recess can therefore be provided between the first and second rail in such a way that the movement device (or carrier) can be moved through the recess to move the lid.

In addition, the first and/or second rail can be formed by a plurality of rail elements. As an alternative to the rails, the guide surfaces can also be the two lateral boundary surfaces of a rail groove provided in a guide element.

The lid can be carried/supported (from below) by the guide surfaces or depositing surfaces, while the hold-down device restricts the movability of the lid upwards by arranging/moving the lid between the guide surfaces or depositing surfaces and the hold-down device.

Particularly preferably, the lid guide can further comprise a gassing device. This gassing device can be arranged on a side (facing the closing device) of the first and/or second rail. The container is gassed by the gassing device before the lid is placed on the container. The gassing can be achieved with a gas like carbon dioxide or nitrogen.

While the first and second rail are preferably designed in such a way that the lid is guided radially and thus preferably moves co-radially to the movement device, the gassing device can be designed in such a way that the lid is guided linearly in a gassing area of the gassing device. This has the advantage that the gassing values can be improved and the transfer to the container can be optimized.

Thus, the gassing is preferably carried out by the gassing device arranged stationary on the (stationary) rails. The gassing no longer must be carried out by a gassing rotor/the movement device.

In particular, the lid no longer has to be placed on the gassing rotor but can rest on the lid guide until it is brought together with the container. This has the advantage that the interfering contours from the gassing rotor during the rising of the container are eliminated. Thus, cost-saving and more hygienic movement devices (such as lid rotors) can be designed.

The first and second rails are preferably designed with the guide and/or depositing surfaces such that they are open at the top. In this way, a cleaning medium can clean the lid support (i.e., the guide and/or depositing surfaces) without hindrance.

Preferably, the feeding device according to the disclosure guides the lids from the de-stacking device until they are transferred to the container. After the de-stacking process, in which the lids are separated individually from the stack by the de-stacking device, the lid lies on the lid guide. The lid guide with movement device can be arranged at least partially in a working space of the sealer below the de stacking device.

The lid is placed on an opening of the container and the container is sealed with the lid. The sealing of the container can comprise positioning the container on a lifting station, seaming the lid to the container by at least one seaming roll, in particular two seaming rolls, and the seaming head. Finally, the sealed container can be discharged from the working space of the sealer.

The working space is the space of the sealer in which the container is preferably sealed with the lid, in particular the space in which a seaming process by the station takes place. Preferably, the working space is surrounded by a housing and thus delimits the working space of the sealer (and thus enables the formation of a hygiene zone).

In particular, the housing can be considered as a cladding, enclosure, casing or sheath which at least partially surrounds the working space. The housing can close off and/or shield the working space from the outside, so that an atmosphere in the working space is hygienically separated from the environment.

The sealing device can comprise a sealing head for sealing the container with the lid. The sealing head can comprise seaming means for seaming the lid to the container. The seaming means can be a seaming roll and a seaming head. The, or each sealing head can therefore comprise at least one seaming roll (particularly preferably two seaming rolls) and one seaming head. The sealing head can comprise seaming shafts or seaming roll pins rotatable about a seaming axis, wherein the seaming means is arranged at one end of the respective seaming shaft/the respective seaming roll pin (seaming head and seaming roll can therefore be rotated in particular via the respective seaming shaft/the respective seaming roll pin).

The sealer according to the disclosure or the station, respectively, can further comprise the lifting station (or a plurality of lifting stations) for lifting the container. The lifting stations can be arranged in the station opposite the sealing heads.

The sealer according to the disclosure is preferably designed as a can sealer. The can sealer usually has several similar sealing stations (of preferably sealing heads and lifting stations) arranged in a carousel shape, in which a can is sealed in each case with a can lid.

Here, the container can be a can and the lid can be a can lid, which are seamed together by the can sealer.

Preferably, the can sealer comprises several sealing heads (as described above with several seaming rolls and one seaming head) for sealing the can. In the operating state, the seaming rolls with their respective seaming profile are brought into contact with a can lid flange of the can lid and a can flange of the can. By rotating the can, the seaming roll is then rotated in the circumferential direction of the can, thereby seaming the can flange with the can lid flange. For rotation of the can, the can is preferably clamped between the seaming head and a support (in particular the lifting station), whereby the seaming head is rotated about the seaming axis by the seaming shaft.

In the context of the disclosure, the can be understood to be a rotationally symmetrical container which is sealed by the can sealer and the associated seaming roll. A can preferably comprise a metal, in particular aluminum or steel.

In principle, the sealer can preferably comprise at least two types of seaming rolls with preferably different seaming profiles (wherein the corresponding sealing head comprises seaming rolls of both types), so that cans can be sealed according to a double-seam principle, in which the cans are generally sealed in two stages. One type of seaming roll is responsible for each stage. The first type of seaming roll makes a pre-seam, while the second type of seaming roll completely seals the can/the package.

Can lids and can bodies can be brought together at a defined point before the actual seaming process. The feeding of the can lids is carried out by the feeding device according to the disclosure, on which the can lids rest. The can bodies are fed by the container feeder. The can bodies pass from the container feeder to one of the respective lifting stations (which are integrated in the station). On one revolution of the station, the lifting stations preferably perform a cam-controlled lifting movement to feed the can bodies from below to the can lid and later to the seaming head.

In principle, the sealer according to the disclosure can be analogous to the can sealers already known from the state of the art but differs in the feeding device and the de-stacking device, respectively, to avoid the disadvantages of the state of the art in this way.

BRIEF DESCRIPTION OF THE DRAWINGS

In the following, the disclosure and the state of the art are explained in more detail based on embodiments with reference to the drawings.

DETAILED DESCRIPTION

Figure 1:
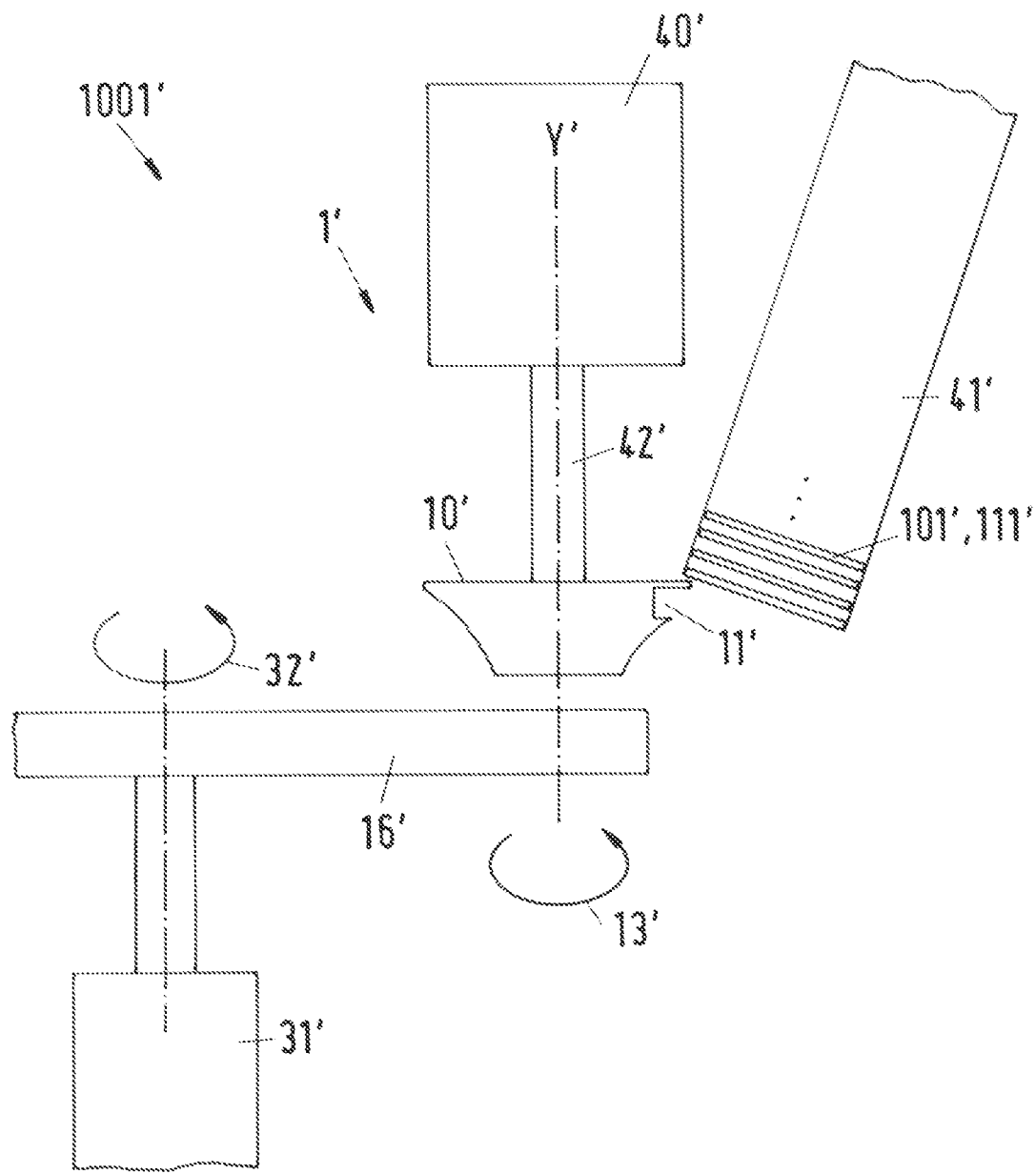
FIG. 1 illustrates a schematic side view of a feeding device of the state of the art.
Figure 2A:
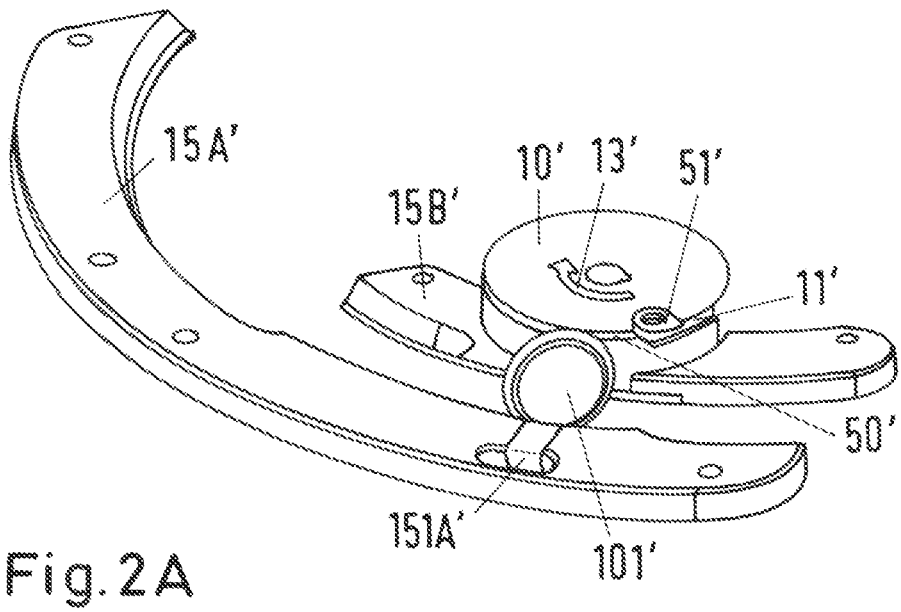
FIG. 2A illustrates a perspective view of a de-stacking device of the state of the art with lid guide.
Figure 2B:
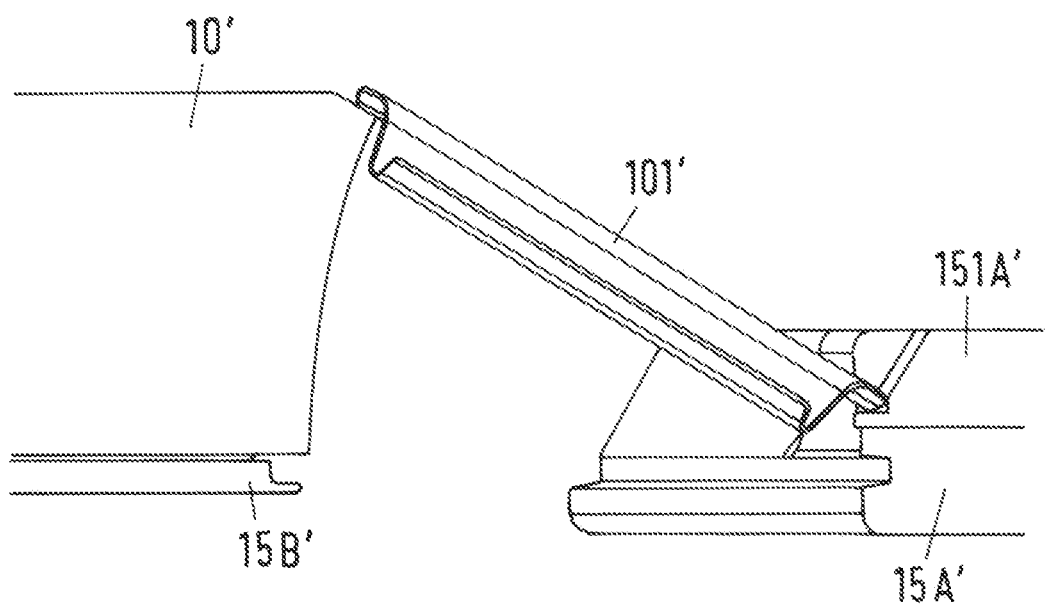
FIG. 2B illustrates a side view of the de-stacking device of the state of the art with lid guide according to FIG. 2A.

FIGS. 1, 2A and 2B have already been described above in the representation of the state of the art.

Figure 3:
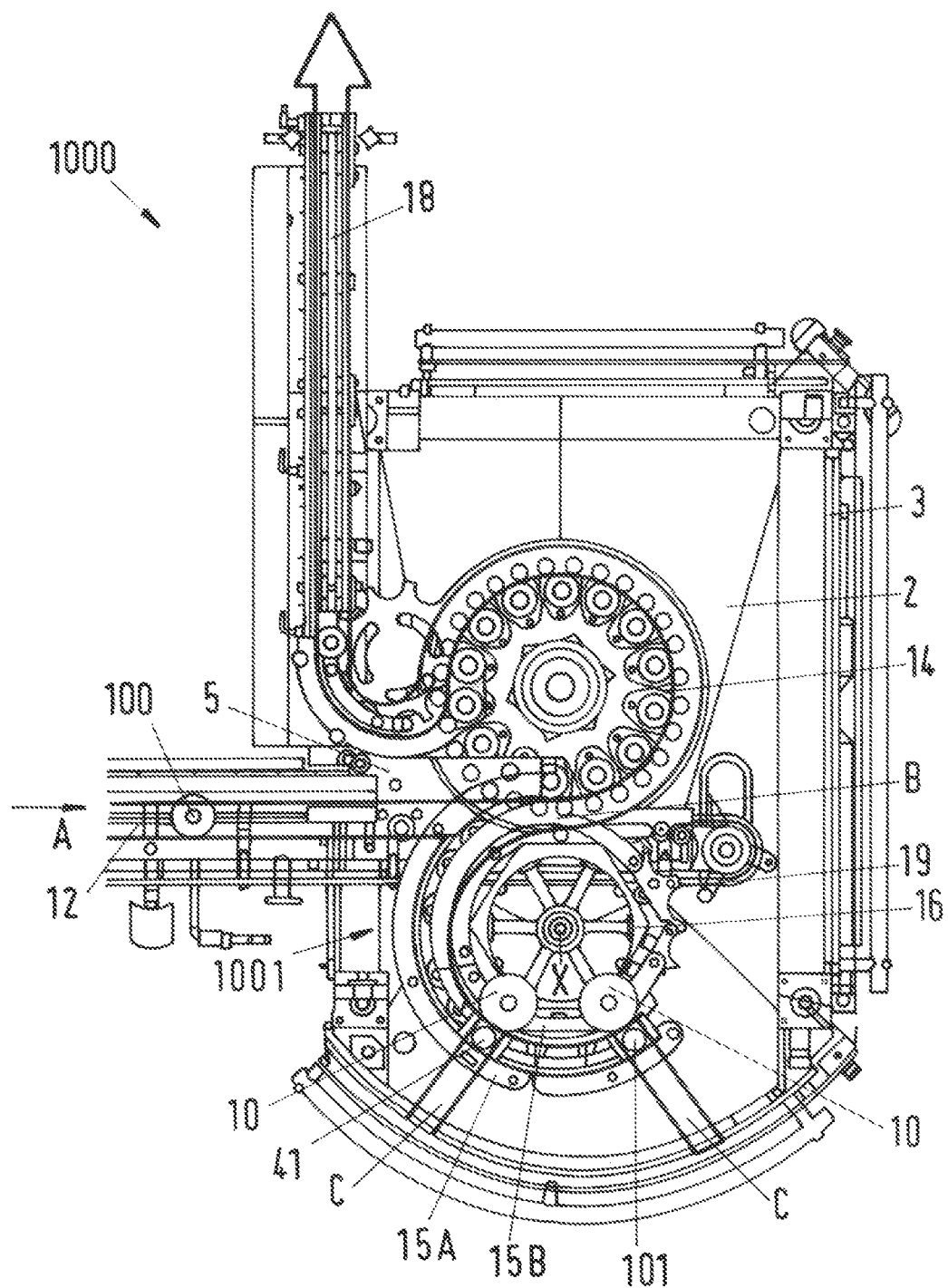
FIG. 3 illustrates a top view of a can sealer according to the disclosure.

FIG. 3 shows a top view of a can sealer 1000 according to the disclosure. The can sealer 1000 according to FIG. 3 comprises two lid feeders 41 for feeding lids 101 in a lid stack to a feeding device 1001 which transports the lids 101 to a can 100.

The feeding device 1001 comprises a movement device 16, which is arranged in a moveable manner in such a way that the lid 101 can be moved to the can 100 by the movement device 16. For this purpose, the movement device 16 is attached to a shaft and arranged in a rotatable manner about an axis X by this shaft, so that the lid 101 can be moved by a rotation of the movement device 16.

In addition, the feeding device 1001 comprises a lid guide 15A, 15B arranged on the movement device 16 for guiding the lid 101 to the can 100. For this purpose, the lid guide 15B has a first rail 15A and a second rail 15B extending parallel to the first rail, wherein the lid 101 is arranged between the rails 15A, 15B in such a way that the lid 101 is guided by the movement of a carrier 19 of the movement device 16 between the rails 15A, 15B to point B, where the lid 101 is united with the can 100 entering along A via the container feed 12.

The carriers 19 arranged on the movement device 16 are distributed and arranged on a surface of the movement device 16 in such a way that they can set the lids 101 arranged on the lid guide 15A, 15B in motion.

In addition, the sealer 1000 comprises a seaming process/station 14 having sealing stations/seaming stations for sealing the can 100 with the lid 101. The seaming process 14 is arranged in a working space 2 of the can sealer 1000 surrounded by a housing 3.

The lid 101 is introduced by the lid feeders 41 into the working space 2 of the can sealer 1000 along the arrow C and guided to the can 100 by the lid guide 15A, 15B.

In doing so, the lids 101 are separated from the lid stack by a de-stacking device and deposited on the rails 15A, 15B. The lids 101 fed in the lid feeder 41 are thus removed via a rotating de-stacking screw 10 of the de-stacking device and transferred to the subsequent lid guide 15A, 15B, which is designed as a conveyor path with the movement device 16 in the form of a transport star 16, by whose carriers 19 the lids 101 de-stacked by the de-stacking screw 10 are transferred. Thus, the lids 101 are transported further by rotation of the movement device 16.

Then, the cans 100 with lid 101 are gassed by a gassing device 5, transported further to the seaming process 14 and sealed there.

The cans 100 with lids 101 are clamped and sealed by the seaming stations. The sealed can is conveyed by a further rotor into a can outlet 13.

Figure 4:
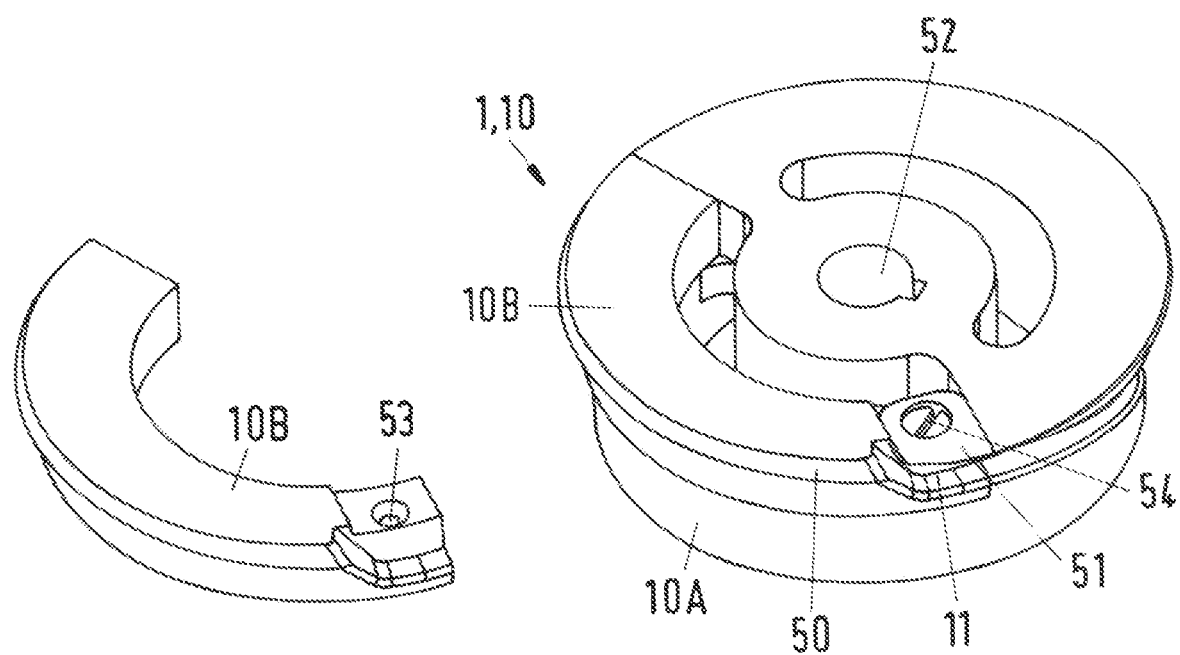
FIG. 4 illustrates a perspective view of a de-stacking device according to the invention.

FIG. 4 shows a perspective view of a de-stacking device 1 according to the disclosure with a removable or replaceable supporting element 10B.

The de-stacking device 1 for separating lids from the lid stack comprises a de-stacking screw 10 having a de-stacking element 10A for separating a lid from the lid stack, the supporting element 10B, a spiral-shaped groove 11 for discharging the separated lid which extends from an upper end of the de-stacking screw 10, at which the lid is received by the groove 11, to a lower end, at which the separated lid is delivered. In this regard, the de-stacking element 10A and the supporting element 10B comprise the groove 11.

In addition, the de-stacking device 1 or the de-stacking screw 10, respectively, comprises a separating element 51, which is arranged at a first end of the groove 11, i.e., at an entrance area for the lid into the groove 11, in such a way that the lid can be separated from the lid stack by the separating element 51 and can be inserted into the groove 11.

The supporting element 10B is a separate element from the de-stacking element 10A which can be attached to the de-stacking element 10A. The supporting element 10B comprises an attachment opening 53, by which a screw 54 can be inserted for attaching the separating element 51 to the supporting element 10B. However, the supporting element 10B is attached to the de-stacking element 10A from the underside.

The separating element 51 is a separating element 51 separate from the de-stacking element 10A, which is designed, for example, as a knife 51 that is attached to the supporting element 10B with the screw that can be inserted into the opening 53. This has the advantage that the knife 51 can be easily replaced when worn.

As an alternative, the separating element 51 could be an integral part of the de-stacking element 10A or the supporting element 10B. Thus, the de-stacking element 10A or the supporting element 10B could comprise the separating element 51. Then, a screw could be inserted through the attachment opening 53 to attach the supporting element 10B to the de-stacking element 10A.

Furthermore, the supporting element 10B comprises a supporting surface 50 designed as a sickle-shaped chamfer 50, on which the lid stack is supported in the operating state before a lid is separated. For this purpose, the supporting surface 50 is positioned relative to the separating element 51 in such a way that the lid can be separated from the lid stack. This is ensured by a height difference between the supporting surface 50 and the separating element 51 being designed in such a way that it essentially corresponds to a thickness of the lid to be separated. This means that the lid is separated from the lid stack via the chamfer 50 and the separating element 51.

A quick format adjustment of the de-stacking device 1 is ensured by the two-part structure with de-stacking element 10A and supporting element 10B. The de-stacking element 10A comprises a receiving opening 52 for a shaft (Which can be an additional part of the de-stacking device). Consequently, the supporting element 10B is connected to the shaft via the de-stacking element 10A, and the de-stacking element 10A is a base element via which the other components are attached to the shaft. Thus, the supporting element 10B can be easily replaced without having to remove the entire de-stacking screw 10 from the shaft.

The format change is made possible by the fact that the supporting element 10B has a different chamfer 50 depending on the lid size.

The lid must lie tangentially to the upper edge of the de-stacking device 1 shortly before the piercing of the separating element. This is controlled by the shape or position of the chamfer 50.

However, not only a format change is simplified by the separate supporting element 10B according to the disclosure. During production, the lid stack is constantly resting on the de-stacking screw 10. This causes wear. When wear is high, only the supporting element 10B has to be replaced. Previously, the entire de-stacking screw 10 had to be replaced if the wear of the chamfer was too great.

Figure 5:
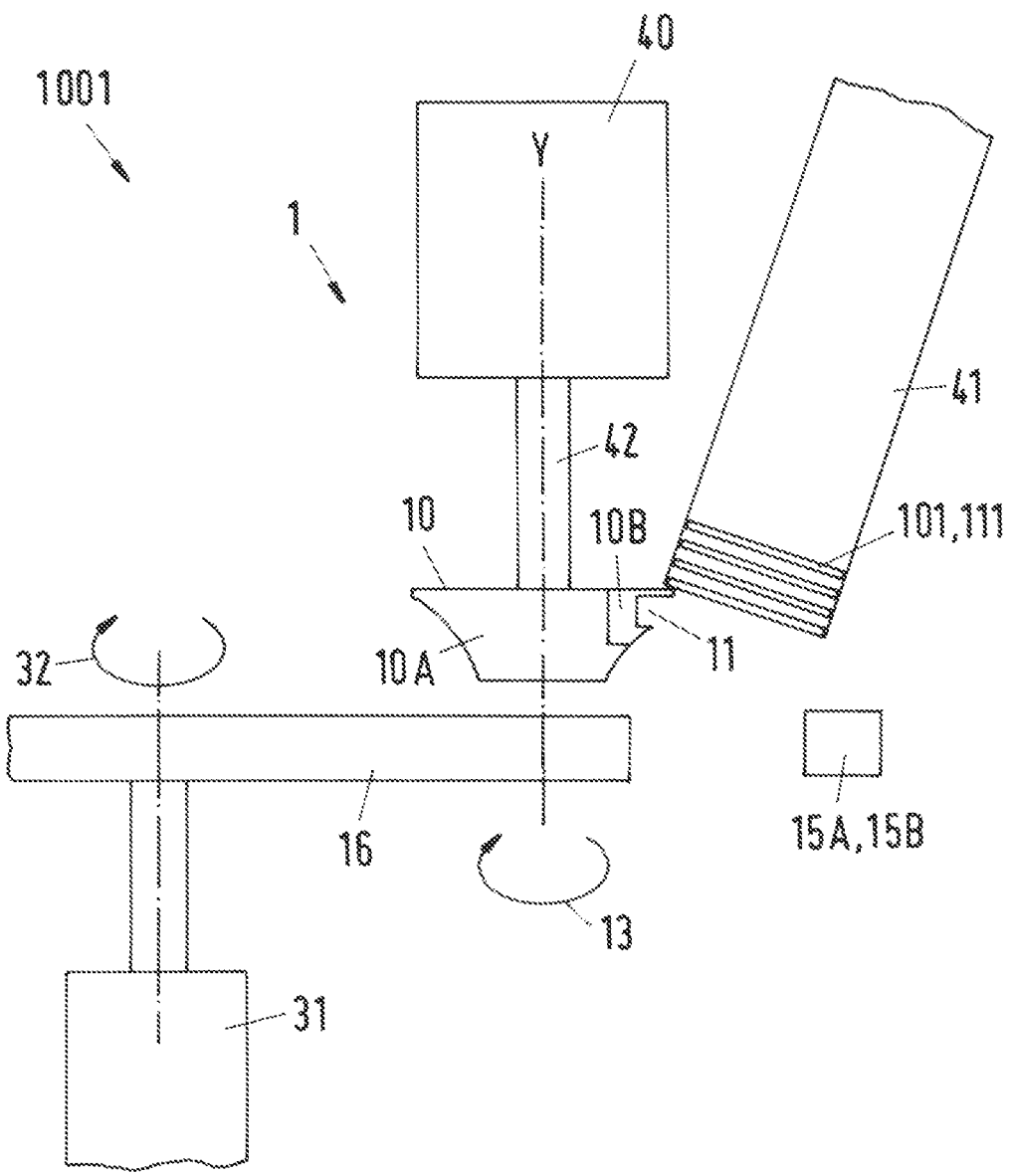
FIG. 5 illustrates a schematic side view of a feeding device according to the disclosure.

FIG. 5 shows a schematic side view of a feeding device 1001 according to the disclosure, which comprises the de-stacking device 1 with the de-stacking screw 10 and the subsequent lid guide 15A, 15B with movement device 16, wherein the movement device 16 has a separate drive 31.

The de-stacking screw 10 segregates and separates the lids 101 from the stack 111 with the aid of the spiral-shaped groove 11. For this purpose, the de-stacking, screw 10 is driven by a servo drive 40, to which it is connected via the shaft 42.

The lids 101 to be conveyed are fed in the lid feeder 41, which is arranged immediately above the de-stacking screw 10. The lids 101 are conveyed downward by gravity in the direction of the de-stacking screw 10. The de-stacking screw 10 is driven by the drive 40, whereby it performs a rotational movement about the axis Y, which is indicated by an arrow 13.

The spiral-shaped groove 11 engages in each case an edge portion of a single lid 101 and is shaped in such a way that it can move a single lid 101 out of the feeder 41 and can corn and deliver it downwardly in the direction of a lid guide 15A, 15B with movement device 16 by the rotational movement 13 of the de-stacking screw 10. After dispensing a single lid 101 to the subsequent lid guide 15A, 15B, the de-stacking screw 10 continues to rotate and can again receive a single lid 101 from the feeder 41 and convey it to the subsequent lid guide 15A, 15B.

The movement device 16 rotates in the direction indicated by an arrow 32. The drive 31 of the movement device 16 and the drive 40 of the de-stacking screw 10 are coordinated with each other in such a way that the delivery speed of the de-stacking screw 10 of lids 101 from the feeder 41 corresponds to the receiving speed of the movement device 16. In this way, one lid 101 is provided in time for each can to be filled and sealed.

To enable a correct separation of the lids 101 from the stack 111, the supporting element 10B of the de-stacking screw 10 can be replaced in the event of a format change (i.e., a changeover to a different, in particular also larger lid size/container size).

Figure 6:
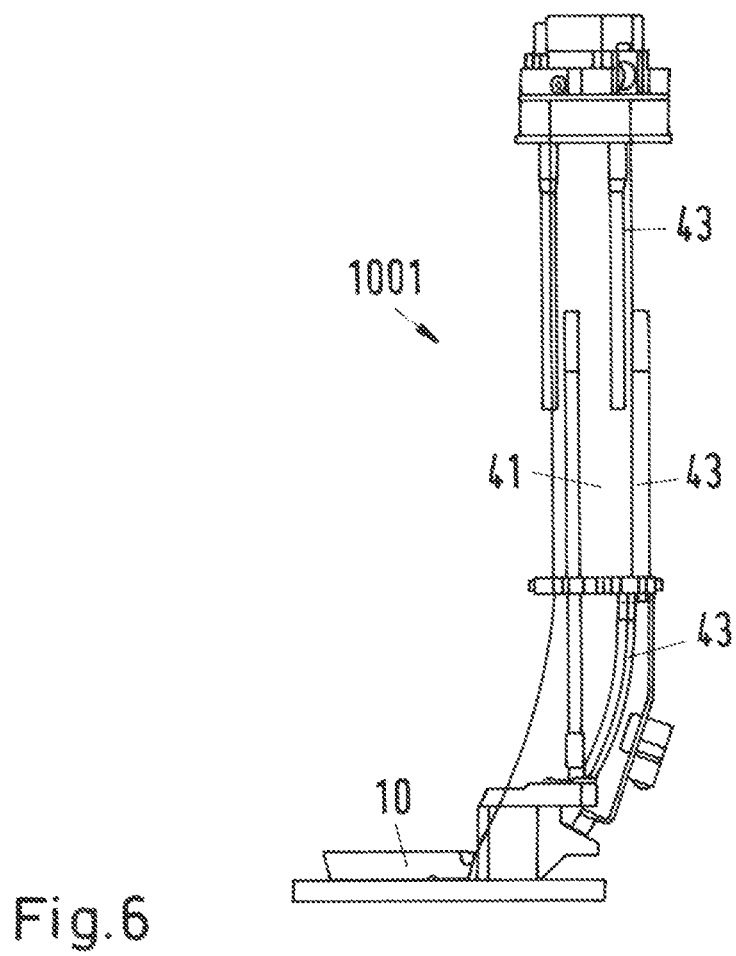
FIG. 6 illustrates a side view of a feeding device according to the disclosure.

FIG. 6 shows a side view of the feeding device 1001 according to the disclosure which has a similar structure as the feeding device 1001 according to FIG. 5. However, in the embodiment according to FIG. 6, the lid feeder 41 comprises a plurality of guide rods 43 by which the lid stack can be guided to the de-stacking device.

Figure 7:
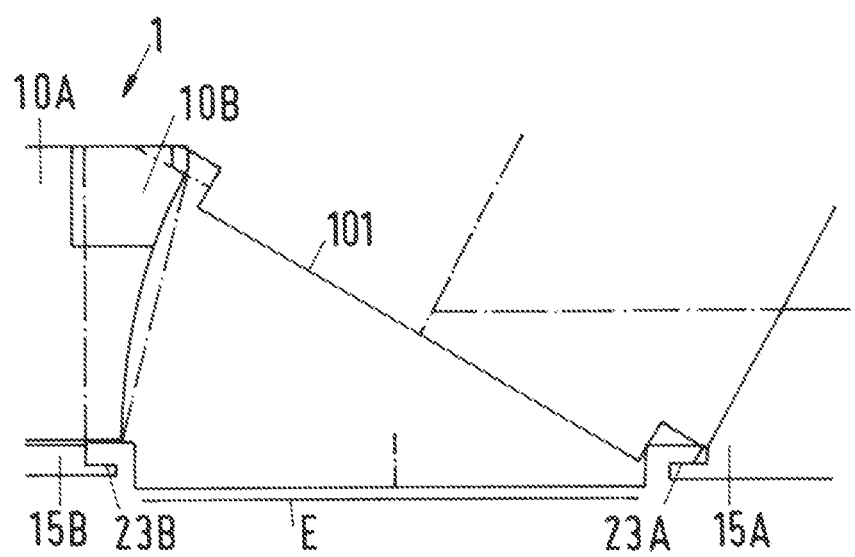
FIG. 7 illustrates a schematic side view of a de-stacking device according to the disclosure with lid guide.

FIG. 7 shows a schematic side view of a de-stacking device 1 according to the disclosure with lid guides 15A, 15B.

The lid guide 15A, 15B comprises a first rail 15A and a second rail 15B which are designed as an outer lid guide 15A and an inner lid guide 15B and can guide the lid 101 along a guide plane E to the sealer (not shown here).

The lid guides 15A, 15B are shaped and arranged relative to each other in such a way that the lid 101 can be moved in the lid guide 15A, 15B exclusively parallel to the guide plane E.

The outer lid guide 15A comprises a first depositing surface 23A and the inner lid guide 15B comprises a second depositing surface 238 on which the lid 101 can be deposited. Here, the depositing surface 23A, 238 are arranged completely parallel to the guide plane E.

Figure 8A:
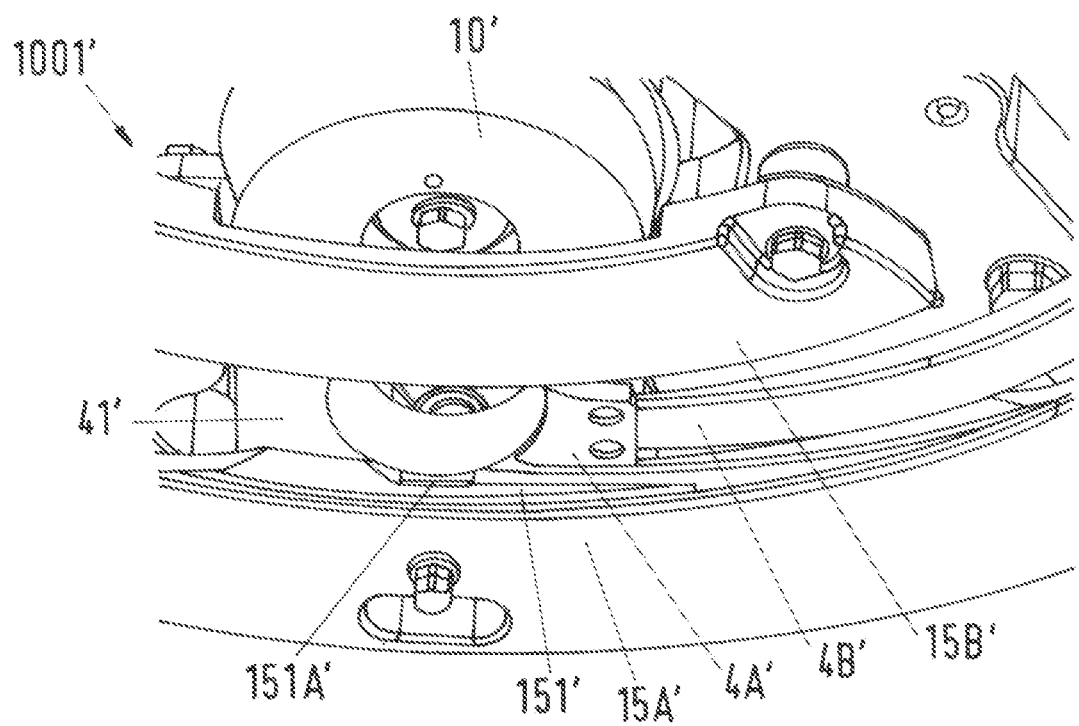
FIG. 8A illustrates perspective view of a feeding device of the state of the art.
Figure 8B:
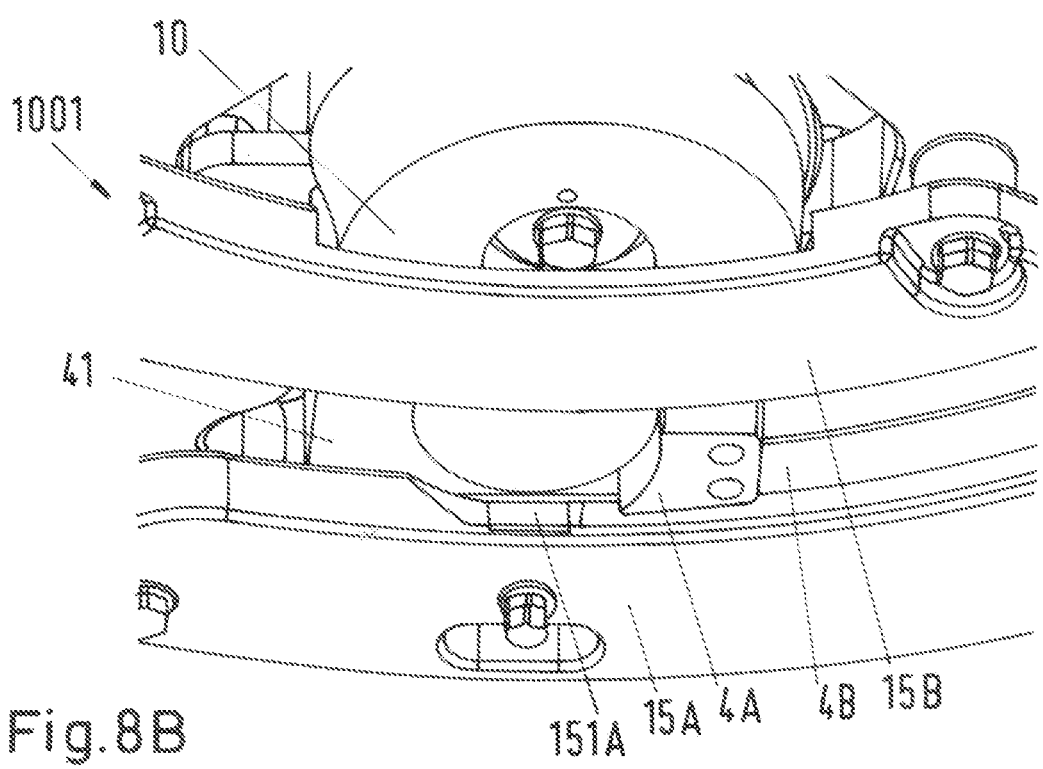
FIG. 8B illustrates perspective view of a feeding device according to the disclosure.

FIG. 8a shows a perspective view of the feeding device 1001' of the state of the art and FIG. 8B shows a perspective view of a feeding device 1001 according to the disclosure.

The feeding device 1001' according to FIG. 8A comprises the outer and the inner lid guide 15A', 15B' for guiding the lid to the sealer (not shown here), In addition, the outer lid guide 15A' comprises the replaceable support 151A'. In addition, the feeding device 1001' comprises the lid feeder 41' for feeding a lid.

The feeding device 1001 according to FIG. 8B also comprises the outer and the inner lid guide 15A, 15B (also with replaceable support 151A) for guiding the lid to the sealer (not shown here) and the lid feeder 41 for inserting the lid in the lid guides 15A, 15B, however, the outer and the inner lid guide 15A, 15B are shaped and arranged on the lid feeder 41 in such a way that the lid can be moved by the movement device exclusively parallel to the guide plane F (not shown here).

In this case, exclusively parallel means that the lid can only be moved parallel to the guide plane after it has been placed in the lid guides 15A, 15B. In contrast to the state of the art according to FIG. 8A, the lid guide 15A, 15B do thus not comprise a ramp 151', which first feeds the lid to a ramp plane that is different from the guide plane and oriented differently, and then aligns it parallel to the guide plane. In this way, a jumping of the lid in the lid guide 15A, 15B can be prevented. Since the lid descent along the outer lid guide 15A' must be realized with large guide grooves and infeed angles (due to the ramp 151'), the lid has a lot of play. This play can lead to the fact that the lids jump out of the guides or lead to a jam in the sealer.

By guiding parallel to the guide plane, a jumping of the lid during the transition from the ramp 151' and thus a lid descent in the outer lid guide, which is prone to malfunctions can be prevented. As a result, an increased process reliability can be ensured.

In addition, FIG. 8A comprises a hold-down device with first and second hold-down element 4A', 4B'. While a hold-down surface of the hold-down elements 4A', 4B' of the state of the art is aligned at least partially along the ramp 151' the hold-down surface of the hold-down elements 4A, 4B according to the disclosure is aligned completely parallel to the guide plane.

Thus, there is a further advantage since the lid can be guided more precisely by the hold-down elements 4A, 4B and lid guides 15A, 15B that are open at the top can be used, which inter alia are easier to clean.

Figure 9:
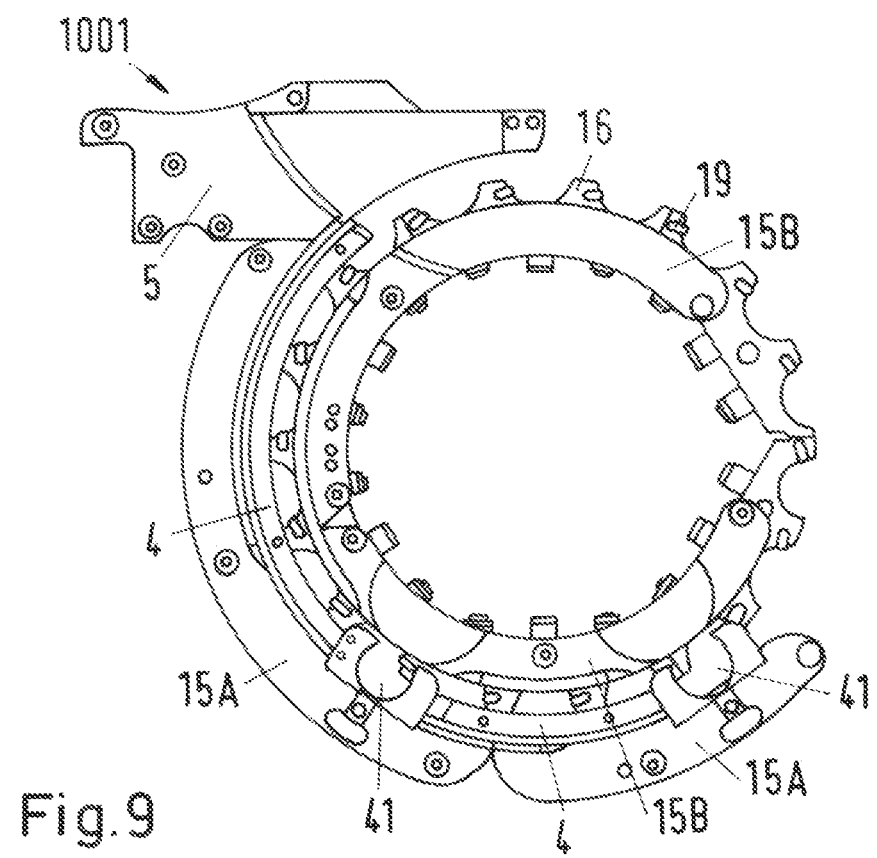
FIG. 9 illustrates a top view of a feeding device according to the disclosure.
Figure 10:
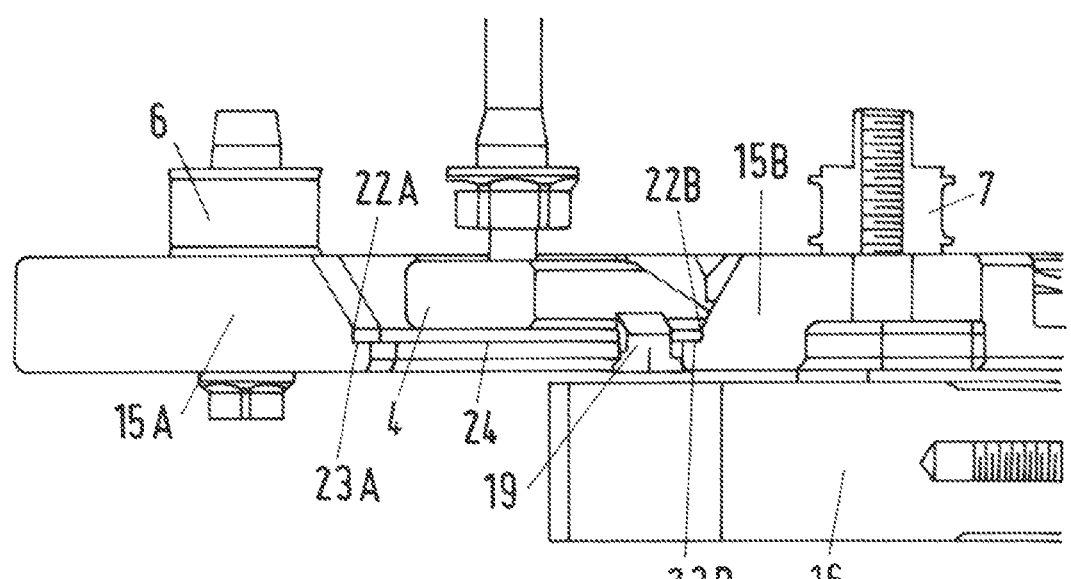
FIG. 10 illustrates a side view of a lid guide according to the disclosure with hold-down device.

FIG. 9 shows a top view of a feeding device 1001 according to the disclosure and FIG. 10 shows a side view of the lid guides 15A, 15B with hold-down device 4.

The movement device 16 is designed in a star-shaped manner, wherein a carrier 19 is attached to each star tip for receiving and moving a lid.

The lid guide 15A, 15B comprises the first rail 15A and the second rail 15B, which runs parallel to the first rail 15A in sections. Thereby, the first rail 15A and the second rail 15B each comprise a plurality of rail elements, which are replaceable for a format change, wherein the second rail 15B is arranged above the movement device 16.

Here, the first rail 15A comprises the first guide surface 22A the second rail 15B comprises the second guide surface 22B in such a way that the lid can be guided to the container by the first and the second rail 15A, 15B.

In addition, the first rail 15A comprises the first depositing surface 23A and the second rail 15B comprises the second depositing surface 23B in such a way that the lid can be guided to the container via the first and the second rail 15A, 15B, i.e., deposited on the depositing surfaces 23A, 23B and moved to the container via them.

The movement device 16 is arranged with upwardly-directed carriers 19 under the first and second rail 15A, 15B. Here, the carriers 19 can be moved in a recess 24 between the first and the second rail 15A, 15B.

The first and the second rails 15A, 15B are designed with the guide surfaces and depositing surfaces 22A, 22B, 23A, 23B such that they are open at the top. In this way, a cleaning medium can clean the lid support (i.e., the guide and/or depositing surfaces) without hindrance.

Furthermore, the lid guide 15A, 15B comprises a gassing device 5. This gassing device 5 is arranged on a side of the first rail 15A facing the seaming process/the station.

While the first and the second rails 15A, 15B are shaped in such a way that the lid 101 is guided radially and thus preferably moves co-radially to the movement device 16, the gassing device 5 is shaped in such a way that the lid is guided linearly in a gassing area of the gassing device 5. This has the advantage that the gassing values can be improved and the transfer to the container can be optimized.

During gassing by the gassing device 5, a gas such as an inert gas is conveyed to an underside of the lid. In this way, it can be ensured that a residual volume of the container in which no foodstuff is arranged is substantially filled with the gas before sealing, whereby the air originally present in the residual volume is displaced as completely as possible by the gas. In this way, it can be possible to achieve a longer shelf life for the foodstuff arranged in the container.

However, before the lids are placed on the lid guide 15A, 15B, the de-stacking process takes place, in which the lids are separated from the stack individually. Then, the lid rests between lateral lid guides, i.e., the rails 15A, 15B, as described above. Then, the lid is transported further to a defined point (point B according to FIG. 3) by the movement device 16, which is formed as a lid star 16, with the aid of the radially attached lid carriers 19 between the lateral lid guides 15A, 15B. The lateral lid guides 15A, 15B together form the lid travel path.

Here, the rail 15B is the inner lid guide 15B. The rail element of the second rail 15B, which is located directly under the de-stacking device, does not have to be replaced in the case of a format change. In this way, changeover times and downtimes are reduced.

The lid is completely placed between the rails 15A, 15B from the de-stacking device up to point B and is preferably guided parallel to the guide plane and is not placed on the lid star 16.

In addition, the hold-down device 4 is arranged above the rails 15A, 15B in such a way that an upward movability of the lid is restricted. In this way, the lid is secured against falling out.

The rails 15A, 15B comprise a quick-change system 6, 7 in the form of quick-change spacer bolts 6 and 7. In this way, the rails 15A, 15B can be replaced with repeat accuracy.

This saves having to readjust the format part after a tool change, which of course has a positive effect on tool change times.

The disclosure is not limited to the disclosed embodiments. Other variations of the disclosed embodiments can be understood and effected by persons skilled in the art in practicing a claimed disclosure from a study of the drawings, the disclosure, and the dependent claims. In the claims, the word "comprising" does not exclude other elements or steps, and the indefinite article "a" or "an" does not exclude a plurality. The mere fact that certain measures are repeated in mutually different dependent claims does not mean that a combination of these measures cannot be advantageously used. Any reference signs in the claims should not be interpreted as limiting the scope.

The invention claimed is:

1. A de-stacking device for separating a lid from a lid stack, comprising:
    a de-stacking element;
    a supporting element to support the lid stack;
    a groove to receive and discharge the lid when separated, the groove arranged on the de-stacking element and the supporting element; and
    a separating element arranged on the groove in such a way that the lid is capable of being separated from the lid stack and received by the groove,
    the supporting element being a separable element from the de-stacking element and arranged on the de-stacking element such that a supporting surface of the supporting element is arranged relative to the separating element in such a way that the lid stack is capable of being supported on the supporting surface and the lid is capable of being separated from the lid stack.

2. The de-stacking device according to claim 1, wherein a position of the supporting surface relative to the separating element is capable of being changed.

3. The de-stacking device according to claim 2, wherein the supporting element is arranged in an exchangeable manner on the de-stacking element in such a way that the position of the supporting surface relative to the separating element is capable of being changed.

4. The de-stacking device according to claim 2, wherein the supporting element is arranged in a displaceable manner on the de-stacking element in such a way that the position of the supporting surface relative to the separating element is capable of being changed.

5. The de-stacking device according to claim 1, wherein the de-stacking device comprises a de-stacking screw and the groove extends in a spiral shape.

6. The de-stacking device according to claim 1, wherein the separating element is separate from the de-stacking element and supporting element and is arranged on the supporting element.

7. The de-stacking device according to claim 1, wherein the supporting surface is a chamfer.

8. A feeding device for feeding a lid to a sealer, comprising:
    a de-stacking device according to claim 1; and
    a lid feeder configured to feed for feeding the lid in the lid stack,
    the lid feeder arranged on the de-stacking device in such a way that the lid capable of being fed in the lid stack is capable of being separated by the de-stacking device.

9. The feeding device according to claim 8, wherein the de-stacking device is arranged in a rotatable manner in such a way that the lid is capable of being separated by rotation of the de-stacking device.

10. The feeding device according to claim 8, further comprising
    a lid guide configured to guide the lid to the sealer, and
    and a movement device arranged on the lid guide, is the movement device arranged in a moveable manner in such a way that the lid is capable of being moved along the lid guide by the movement device,
    the lid guide arranged on the de-stacking device in such a way that the lid when separated from the lid stack is capable of being introduced into the lid guide.

11. The feeding device according to claim 10, wherein the lid guide is configured to guide the lid along a guide plane, and the lid is capable of being moved along the guide plane by the movement device, the lid guide formed in such a way that the lid is capable of being moved in the lid guide exclusively parallel to the guide plane.

12. The feeding device according to claim 10, wherein the lid guide comprises a depositing surface on which the lid is capable of being deposited or comprises a first guide surface and a second guide surface, and the lid is capable of being arranged between the first guide surface and the second guide surface in such a way that the lid is capable of being guided to the sealer by relative movement of the movement device to the first guide surface and the second guide surface.

13. The feeding device according to claim 12, wherein the lid guide comprises a first rail and a second rail extending parallel to the first rail, and the first rail comprises the first guide surface and the second rail comprises the second guide surface such that the lid is capable of being guided to the sealer by the first rail and the second rail.

14. A sealer, comprising:
    a station having a plurality of sealing devices;
    a container feed configured to feed a container to the station;
    a feeding device according to claim 1; and
    an outlet for the container when sealed from the station.

15. A method for separating lids from a lid stack, comprising:
    providing a feeding device according to claim 8, and
    feeding the lid the lid feeder in the lid stack and the lid fed in the lid stack separated by the de-stacking device.

16. The feeding device according to claim 10, wherein the lid guide comprises a first depositing surface and a second depositing surface on which the lid is capable of being deposited.

17. The feeding device according to claim 16, wherein the lid guide comprises a first rail and a second rail extending parallel to the first rail, and the first rail comprises the first depositing surface and the second rail comprises the second depositing surface such that the lid is capable of being guided to the sealer by the first rail and the second rail.

18. A sealer, comprising:
    a station having a plurality of sealing devices;
    a container feed configured to feed a container filled with a product to the station;
    a feeding device according to claim 1; and
    an outlet for the container when sealed from the station.

* * * * *